July 24, 1962 S. ROSENTHAL 3,045,779
ELECTROMECHANICAL LINEAR RECIPROCAL ACTUATOR
Filed March 7, 1961 3 Sheets-Sheet 1
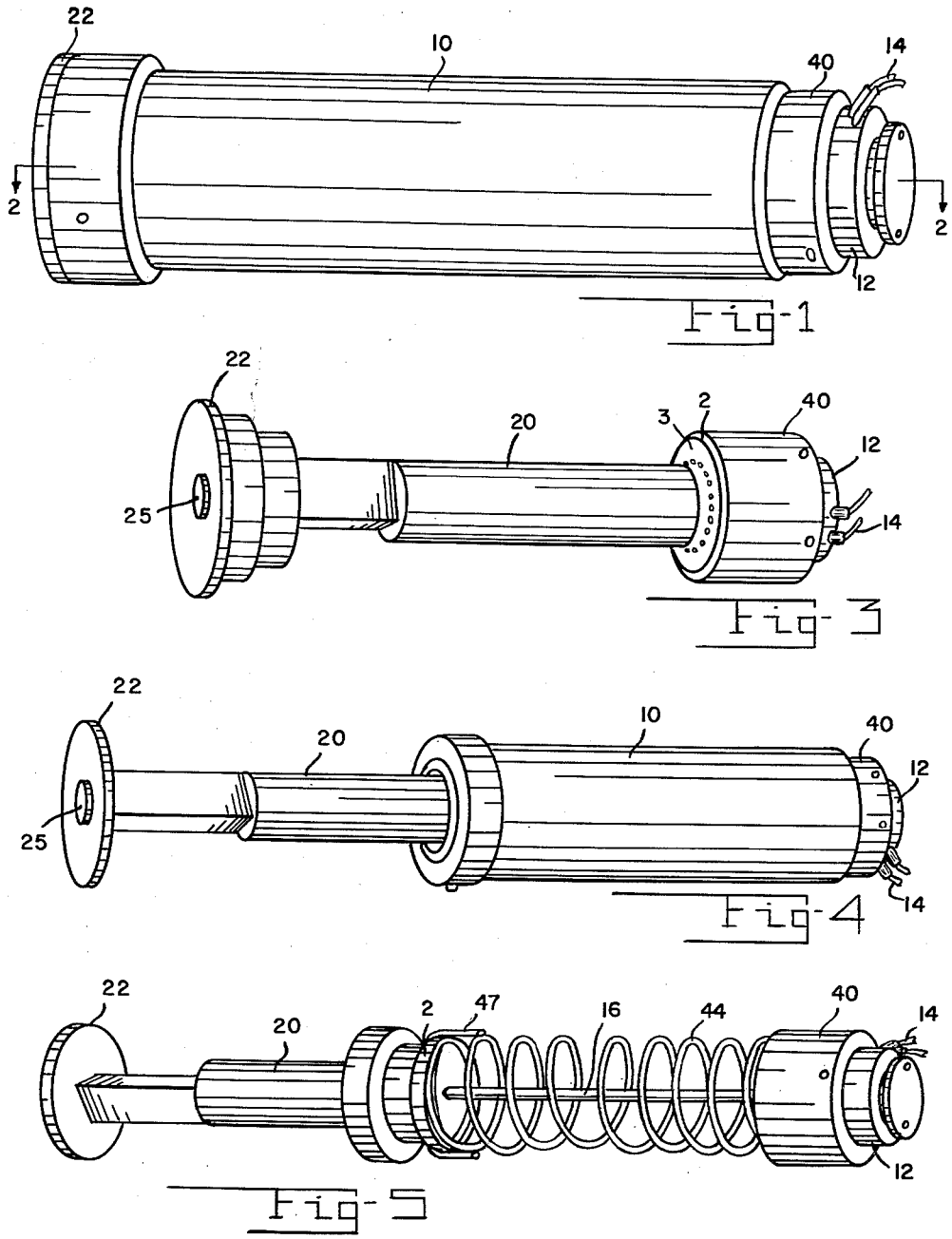
INVENTOR.
SIDNEY ROSENTHAL
BY
ATTORNEYS July 24, 1962 S. ROSENTHAL 3,045,779
ELECTROMECHANICAL LINEAR RECIPROCAL ACTUATOR
Filed March 7, 1961 3 Sheets-Sheet 2
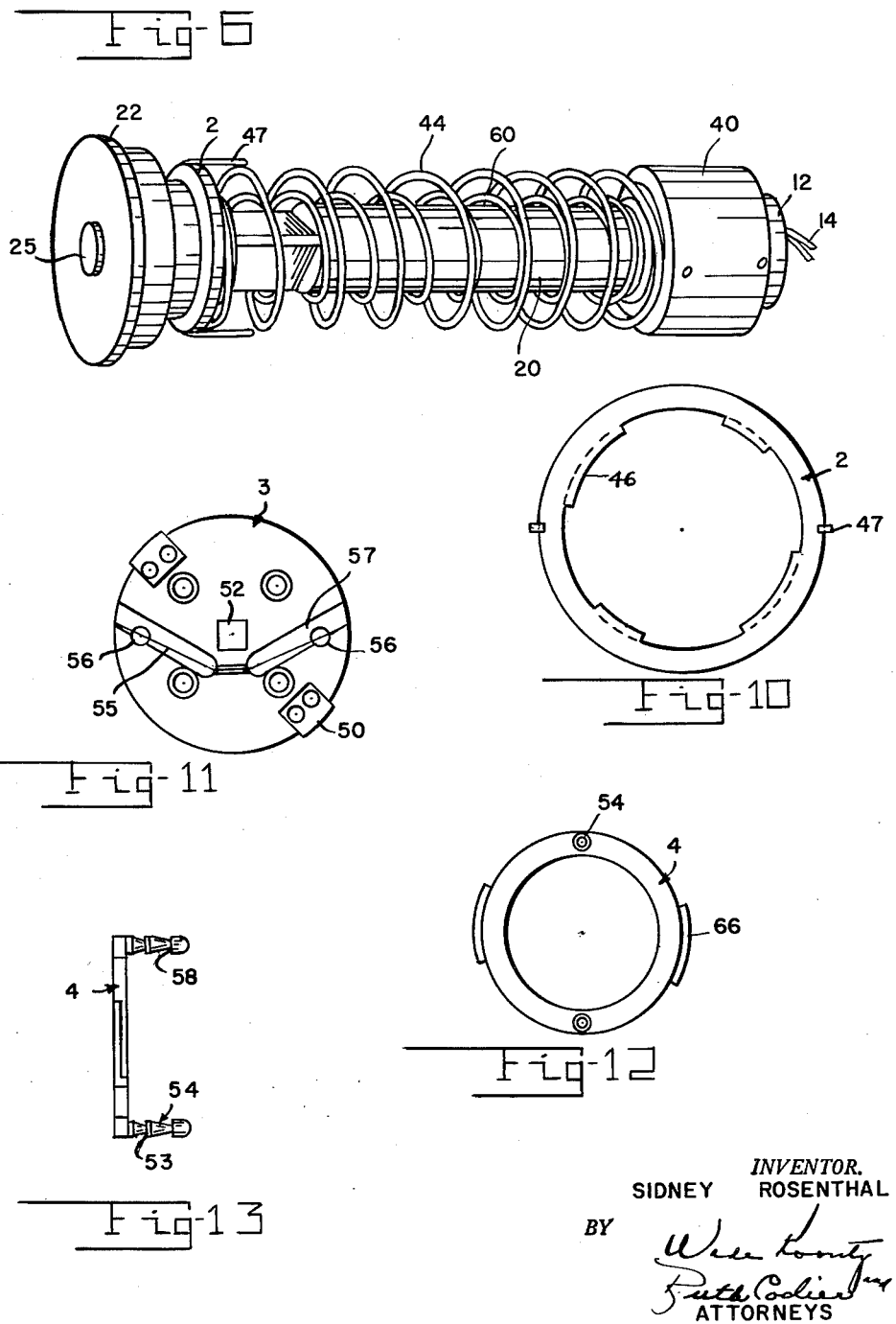
INVENTOR.
SIDNEY ROSENTHAL
BY
ATTORNEYS

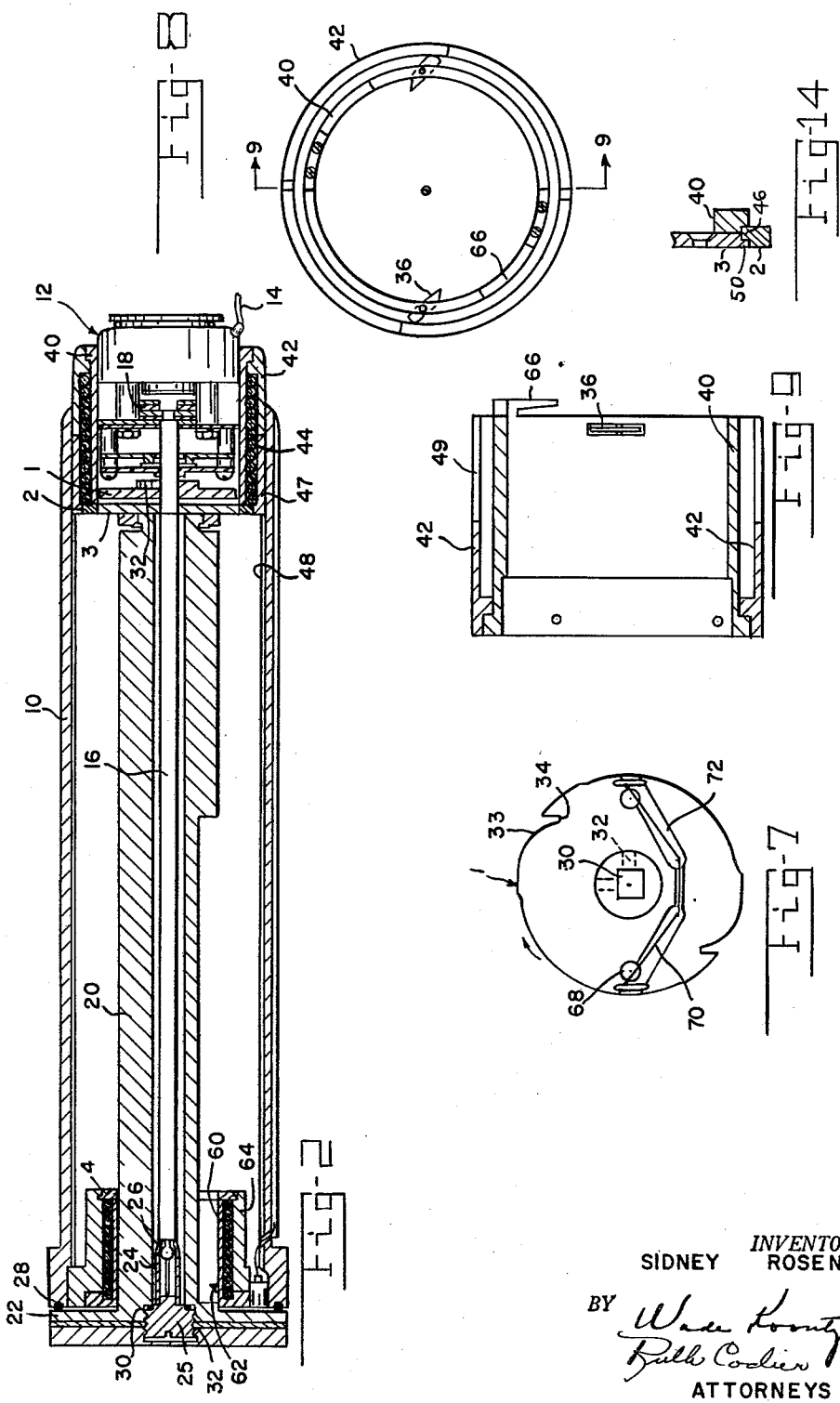

United States Patent Office 3,045,779
Patented July 24, 1962

3,045,779
ELECTROMECHANICAL LINEAR RECIPROCAL ACTUATOR
Sidney Rosenthal, West Newton, Mass., assignor to the United States of America as represented by the Secretary of the Air Force
Filed Mar. 7, 1961, Ser. No. 94,088
8 Claims. (Cl. 185—37)
(Granted under Title 35, U.S. Code (1952), sec. 266)

The invention described herein may be manufactured and used by or for the United States Government for governmental purposes without payment to me of any royalty thereon.

This invention relates to an electromechanical linear reciprocal actuator and, more particularly, to rocket and satellite probes for projecting instruments out of the protective body of a vehicle after it has cleared the upper atmosphere and of returning the instrument to the inside of the protective body of the vehicle before re-entry into the atmosphere and resealing the port through which the instrument was projected, exposed and returned so that the instrument is protected from exposure and is maintained in dry and undamaged condition for recovery.

The object of the invention is the provision of practical electromechanical means for projecting an instrument from the body of a space, or other vehicle, returning it when desired back into the body of the vehicle and thereafter sealing the opening through which the instrument has passed. The member is projected instantaneously by pulsing a rotary-solenoid, either directly or remotely at any predetermined time. A second pulse of the rotary-solenoid, which can occur at any time after the first pulse, prepares the unit for retraction; the third pulse causes the instrument to return to its original position inside the vehicle; and the fourth and last pulse locks and seals the opening through which the instrument passed.

The essence of the invention lies in creating a device wherein a probe may be expelled to a testing position outside a space craft, and may be subsequently withdrawn without the necessity of overcoming the strength of the spring which propelled it outward. This is accomplished by locating the compressed retracting spring at a position adjacent the skin of the aircraft, that is, adjacent the outward end of the probe when the probe is retracted, and adjacent its inner when it is in expelled position. When the probe is expelled, a cam is carried forward with the expelling spring and engaged with a cam located near the skin of the aircraft and instrumental in maintaining the retracting spring in compressed condition. When the second named cam is rotated to release the retracting spring, the retracting spring expands, carrying both cams rearwardly and retracting the probe. After the probe has been expelled, the expelling spring is released from any engagement with it, so that it no longer exerts any bias thereon. The retracting spring is of lesser diameter so that, in extended position, it will lie inside the coils of the expelling spring. By this means, it is not necessary for the retracting spring to overcome the bias of the expelling spring, and can thus be made with less tension and strength than would be necessary if the probe remained attached to the expelling spring.

An object of the invention is the provision of such an instrumentation contained in a single cylindrical tube casing.

A further object of the invention is the elimination of hydraulic and pneumatic apparatus including the usual paraphernalia of pumps, valves, tanks, etc.; since all of the problems created by pressure machinery are greatly magnified when this type of apparatus is transferred for operation in space. The unit is favorably adapted to "space" work where weight, space and time are important factors. The design of the springs is the only limiting factor as to how far or how heavy the instrumentation can be projected or retracted.

Other advantages will appear as the description proceeds.

In the drawing, FIG. 1 is a perspective view of the casing containing the probe instrument inside it before its projection.

FIG. 2 is a cross section taken on the line 2—2 of FIG. 1.

FIG. 3 is a perspective view of the device as in FIG. 1 before firing and with the outer case removed.

FIG. 4 is a perspective view of the device in projected condition.

FIG. 5 is a perspective view of the device in projected condition as in FIG. 4 showing the outer case removed for viewing of the positions of the various members.

FIG. 6 is a perspective view of the device in retracted and sealed condition with the outer case removed for viewing of the relative positions of the parts of the device.

FIG. 7 is a plan view of cam 1.

FIG. 8 is an end view of the large spring housing and the cam engaging sleeve.

FIG. 9 is a cross section taken on the line 9—9 of FIG. 8.

FIG. 10 is a plan view of cam 2.

FIG. 11 is a plan view of cam 3.

FIG. 12 is a plan view of cam 4.

FIG. 13 is an elevational side view of cam 4 of FIG. 12.

FIG. 14 is a detail cross section showing the engaging relationship of cams 2 and 3.

Referring more in detail to the drawing wherein like reference characters refer to like parts:

The numerals 1, 2, 3 and 4 refer to cam 1, cam 2, cam 3 and cam 4 respectively whose functions and form will later be described in detail.

The device before firing and as shown in FIG. 1 is contained within a casing 10. A standard solenoid assembly unit is indicated in entirety by the numeral 12. It comprises a lead in 14, a solenoid shaft 16 which is square in cross section and the standard solenoid disks 18. The operation of the device is motivated through the rotary movement of solenoid shaft 16 around its longitudinal axis. The solenoid disks 18 govern the amount of rotation imparted to the shaft 16, and are of standard form selected to accomplish a desired result. The specific solenoid used is a 12-position device equipped to render a 30° rotation per pulse. Only four pulses are used in the present application. It is to be understood that other types of solenoid may be used without departing from the spirit of the invention.

The solenoid shaft 16 is housed, in the prefered condition of the device within an axial bore in the ejector element 20. The ejector element 20 has a sealing disk 22 which seals the opening through which the ejector element passes both before the ejection operation and after the retraction. A resilient sleeve 24 is secured to the disk 22 by a sealed and screw threaded central element 25. The disk 22 engages a ball 26 on the end of the shaft 16, forming a severable connection.

An O-ring 28 forms a seal between the disk 22 and the casing 10. A cam 1 is provided with a rectangular central opening 30 for receiving the shaft 16, and is rigidly attached thereto by set screws 32 or other expedient means. Cam surfaces 33 on cam 1 lie adjacent slots 34 which, in the assembled and unfired condition shown in FIGS. 1 and 2, engage the pivoted spring finger 36 on the solenoid housing sleeve 40. The sleeve 40, together with an outer spaced sleeve 42 form a spring housing. A large ejector spring 44 is field compressed between an inner shoulder on the sleeve 42 and cam 2. Cam 2 is a ring shaped element (see FIG. 10) provided with inwardly directed detents 46 and a pair of normally directed pins 47 which slide in grooves 48 in the casing 10 and fit into slots 49 in the sleeve 42. FIG. 2 shows the slidable engagement of pins 47 and grooves 48 and FIG. 14 shows the engagement of cams 2 and 3 by means of interlocking flanges 46 and 50 on cams 2 and 3 respectively. The angular relationship of flanges 46 and pin 47 precludes the showing of both of these elements in the same cross-sectional view.

The first pulse of the solenoid rotates cam 1, disengaging fingers 36 from the slots 34. The heavy compression spring 44 is thereby released and cam 2 is pushed outward, taking cam 3 with it, since cams 2 and 3 at this stage remain connected to each other by means of interlocking flanges 46 and 50 on cams 2 and 3 respectively.

Cam 3 has a central rectangular opening 52 (see FIG. 11) through which the shaft 16 is slidably fitted. The ejector element 20 which is attached to cam 3 is thus projected outwardly. The relative position of the parts of the device at this stage is shown in FIG. 4 and in FIG. 5 with the casing 10 removed. Cam 3 has traveled down the length if the shaft 16 until contact is made with cam 4. The shoulders 53 and 58 of the pins 54 carried by cam 4 operate as locking pins or hooks. The pins 54 engage through openings 56 in cam 3 and the cams 3 and 4 thereafter remain interconnected. This interconnection is secured by the wire spring 55 lying in a groove 57 in cam 3 and engaging the shoulders 53. The second pair of shoulders 58 operate in the final sealing of the device as hereinafter described.

The second pulse of the solenoid rotates cam 3 and disengages the interlocking detents 50 and 46 of cams 2 and 3 respectively, since cam 2 is held stationary by engagement of pins 47 in grooves 48. This readies the device for the retraction of the ejector element and removes the necessity for the recompression of the heavy spring 44.

Until the third pulse of the solenoid, the retract spring 60 remains under compression between cam 4 and a sleeve 62, fitted within a spring housing 64 and held by flange 66. At the third pulse, cam 3 again is rotated and since an engagement has been effected between cams 3 and 4, cam 4 is also rotated, thus disengaging cam 4 from spring housing sleeve 64 and releasing the spring 60. The plunger element is thus retracted, the retract spring 60 expanding inside the coils of the heavy duty spring 44. At retraction, the pins 54, protruding through cam 3, slide into openings 68 in cam 1. The second shoulder 58 engages wire spring 70 which is seated in slots 72, to lock the cams 3 and 4 together. In the same manner, the shoulder 53 of pin 54 is locked into opening 56 of cam 3 and is held from disengagement by the spring 55 seated in slots 57.

The fourth pulse provides a final sealing action. The shoulders 50 on cam 3, which have been freed from the detents on cam 2, engage with the locking hooks 66 on the housing sleeve 40 effecting a water-tight seal and preventing the retracted element from bouncing off the O-ring.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. In a linear reciprocal actuator, a container casing, an ejector probe, a solenoid for operating said probe for ejection of said probe from said casing, a solenoid shaft for receiving axial rotary motion from said solenoid, a cam system comprising a first cam element immovably attached to said solenoid shaft for rotation therewith, a second cam element comprising a ring having inwardly directed flanges thereon, a third cam element, shoulders on said third cam element for engaging the flanges of said second cam for releasably retaining said second and third cam elements in engagement, an ejector spring, an ejector spring housing comprising an outer sleeve element and an inner sleeve element, said inner sleeve element operating also as a solenoid housing, said ejector spring seating between and compressed by a flange on said outer sleeve and said second cam, releasable securing means for securing said first cam to said spring housing to maintain said spring in compressed condition, said means being releasable upon rotary movement of said first cam.

2. An outer space sampling probe adapted to be carried within a space vehicle, said probe comprising an ejector probe member, spring means for ejecting said probe from the inside of said vehicle to the outside thereof, means for detaching said spring from said probe after said probe has been ejected, a second spring means for returning said probe to the inside of said vehicle whereby said probe may be returned with a force from said second spring which is independent of the force from said first spring.

3. An outer space sampling instrument comprising an outer casing capable of being carried within a space vehicle, an ejector probe capable of being ejected to the exterior of said vehicle, a solenoid housed within said casing, including a solenoid shaft extending axially through said casing for receiving impulses from said solenoid and imparting predetermined rotary motion about the longitudinal axis of said shaft, a first cam rigidly mounted on said shaft for moving with said shaft, a second cam member, a third cam member, said third cam member being slidably mounted on said solenoid shaft, and having contact with said ejector member, releasable interlocking engagement between said second and third cams, an ejector spring housed within said casing and compressibly seated on said second cam, a spring housing sleeve, means for connecting said first cam to said sleeve for retaining said spring in compressed condition, said means being disconnected upon rotary motion of said solenoid shaft, and upon a first impulse imparted to said shaft by said solenoid whereby said spring is released and said probe member is projected outwardly together with said second and third cams, a second impulse from said solenoid disengaging said engagement between said second and third cams and readying said ejector for return independent of the necessity of compression of said ejector spring, a retraction spring carried within the opposite end of said casing, a fourth cam, inwardly extending pins on said fourth cam, hook means carried by said pin, openings in said third and first cams, said pins engaging in the openings in said first cam with the ejection of said probe member, said third cam being impaled thereon and held against rotation so that a second impulse of said solenoid may rotate said solenoid shaft together with said third cam, and whereby the engagement of said second and third cams is freed, and whereby a third impulse from said solenoid releases said retract spring and returns said probe member to a position within said casing, sealing means operated by a fourth impulse to seal said probe within said casing.

4. A linear reciprocal actuator capable of being extended and retracted through the wall of a space vehicle or other housing instrumentation, said actuator comprising a casing, an ejector probe carried within said casing, spring means for ejecting said probe to a position outside of said casing and outside of said vehicle, and spring means for returning said probe to a position within said vehicle and inside of said casing, a shaft in said casing and extending longitudinally thereof, impulse operated means for imparting predetermined rotary motion to said shaft about the longitudinal axis thereof, means responsive to the rotary movement of said shaft for releasing said first spring for ejecting said probe, a second means responsive to a second predetermined rotary movement of said shaft for releasing said second spring for returning said probe to a position within said casing.

5. A linear reciprocal actuator comprising a casing capable of attachment through the wall of a space vehicle, an ejector probe carried in said casing, an ejector spring contacting said probe for ejecting said probe to a position outside of said casing, seating means in the form of a locked cam for maintaining said spring in compressed condition, means for releasing said seating means for release of said ejector spring for propelling said probe outward, means for releasing said cam from connection with said spring whereby said probe may be returned to said casing independently of the recompression of said ejector spring, a retract spring for returning said probe to said position within said casing, sealing means for sealing the opening through which said probe has passed, said sealing means being effective only after the return of said probe to said casing.

6. An outer space sampling instrument comprising a casing for carrying said instrument and capable of attaching through the wall of a space vehicle, an ejector probe carried within said vehicle, an ejector spring in contact with said probe for ejecting said probe to a position outside of said vehicle, seating means in the form of a locked cam for maintaining said spring in compressed condition, means for releasing said seating means for release of said ejector spring for propelling said probe outward, means for releasing said cam from connection with said spring whereby said probe may be returned to said casing without recompression of said ejector spring, a retract spring for returning said probe to said casing, sealing means for sealing the opening through which said probe has passed, said sealing means being effective only after the return of said probe to said casing, a solenoid, a solenoid shaft attached thereto for imparting impulses from said solenoid, the release of the ejector spring, the severing of the connection between the ejector spring and said seating means, the release of said retract spring, and the sealing of said casing being actuated by successive and predetermined impulses from said solenoid.

7. A device for ejecting a probe from a protected body into a surrounding medium and retracting said probe into said body, said device comprising a shaft, a probe body non-rotatably fixed to said shaft and slidable with respect thereto, spring means for propelling said probe to a position outside said body while remaining attached thereto, a spring housing sleeve located within said body and surrounding said probe, a spring in said housing, a cam engaging said sleeve and confining said spring in compressed condition, means located adjacent the rearward end of said probe for engaging said cam when said probe is ejected, and means for releasing said spring to return said probe to retracted position, said last named spring operating independently of said first named spring means.

8. A device for ejecting a probe from a protected body into a surrounding medium and retracting said probe into said body, said device comprising a shaft, a probe body non-rotatably fixed to said shaft and slidable with respect thereto, spring means for propelling said probe to a position outside said body while remaining attached thereto, a second spring means located within said body and surrounding said probe and located adjacent the forward end of said probe when said probe is in retracted position and adjacent the rearward end of said probe when said probe is in ejected position, means for removing the bias of said first named spring means from said probe, and means for releasing said second spring means to return said probe to retracted position independently of the bias of said first named spring.

References Cited in the file of this patent
UNITED STATES PATENTS

| | | |
|---|---|---|
| 2,187,012 | Brenner | Jan. 16, 1940 |
| 2,288,822 | McCarron | July 7, 1942 |
| 2,873,159 | Becker | Feb. 10, 1959 |